United States Patent
Kamimura

(10) Patent No.: US 7,683,823 B2
(45) Date of Patent: Mar. 23, 2010

(54) DME GROUND APPARATUS

(75) Inventor: Yukihiro Kamimura, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/141,304

(22) Filed: Jun. 18, 2008

(65) Prior Publication Data

US 2009/0033541 A1      Feb. 5, 2009

(30) Foreign Application Priority Data

Jul. 2, 2007      (JP)      ............................. 2007-174227

(51) Int. Cl.
G01S 13/00     (2006.01)
G01S 15/74     (2006.01)
G01S 13/08     (2006.01)

(52) U.S. Cl. ............................. 342/47; 342/36; 342/37; 342/42; 342/46

(58) Field of Classification Search ............. 342/36–38, 342/42, 46, 47, 59, 125
See application file for complete search history.

(56) References Cited

U.S. PATENT DOCUMENTS

| | | | |
|---|---|---|---|
| 2,979,609 A * | 4/1961 | Biagi ....................... | 455/226.2 |
| 3,870,993 A * | 3/1975 | Biagi et al. .................. | 342/47 |
| 3,953,802 A * | 4/1976 | Morris et al. ................ | 375/349 |
| 3,969,725 A * | 7/1976 | Couvillon et al. ............. | 342/47 |
| 4,564,840 A * | 1/1986 | Brisse et al. .................. | 342/47 |
| 4,642,639 A * | 2/1987 | Nelson ........................ | 342/47 |
| 4,646,097 A * | 2/1987 | King ........................... | 342/95 |
| 7,161,528 B2 * | 1/2007 | Kirby et al. ................. | 342/159 |

FOREIGN PATENT DOCUMENTS

| JP | 64-23633 | 1/1989 |
|---|---|---|
| JP | 3-71080 | 3/1991 |
| JP | 2629612 | 4/1997 |

OTHER PUBLICATIONS

R. J. Kelly, "System Considerations for the New DME/P International Standard", IEEE Transactions on Aerospace and Electronic Systems, vol. AES-20, No. 1, Jan. 1984, 24 Pages.

* cited by examiner

*Primary Examiner*—Thomas H Tarcza
*Assistant Examiner*—Peter M Bythrow
(74) *Attorney, Agent, or Firm*—Oblon, Spivak, McClelland, Maier & Neustadt, L.L.P.

(57) ABSTRACT

A transponder unit of a DME ground apparatus receives an interrogation signal and converts the same to an IF signal. The unit performs analog-to-digital conversion on the IF signal, generating a digital interrogation signal. The unit calculates two detected outputs whose frequencies are ±900 kHz deviated with respect to the center frequency of the digital interrogation signal. Then, the transponder unit compares the two detected outputs and the digital interrogation signal in terms of magnitude, thereby to determine whether a response signal should be transmitted.

7 Claims, 1 Drawing Sheet

DME GROUND APPARATUS

CROSS-REFERENCE TO RELATED APPLICATIONS

This application is based upon and claims the benefit of priority from the prior Japanese Patent Application No. 2007-174227 filed on Jul. 2, 2007, the entire contents of which are incorporated herein by reference.

BACKGROUND OF THE INVENTION

1. Field of the Invention

The present invention relates to distance measuring equipment (DME) that measures the distance between an aircraft and a ground apparatus. More particularly, the invention relates to a DME ground apparatus that retransmits a pulse signal in response to a signal coming from an interrogator mounted on the aircraft, upon lapse of a preset delay time.

2. Description of the Related Art

The distance measuring equipment (hereinafter referred to as DME apparatus is a secondary radar system composed of an airborne apparatus and a ground apparatus. The airborne apparatus is mounted in an aircraft. The ground apparatus is provided on the ground and communicates with the airborne apparatus.

The DME apparatus has a transmitting-receiving device called an interrogator as a DME airborne apparatus (hereinafter referred to as airborne apparatus) on the aircraft and a transmitting-receiving device called a transponder as a DME ground apparatus on the ground side.

The interrogator provided in the airborne apparatus transmits interrogation pulses (pair pulses) of UHF band toward the transponder provided in the DME ground apparatus. (The interrogator and the transponder keep communicating with each other, with a frequency difference of 63 MHz, because the frequency allocated to the interrogator is 1,025 to 1,150 MHz and the frequency allocated to the transponder is 962 to 1,213 MHz.) The distance between the aircraft and the ground apparatus is measured from the time that elapses until the interrogator receives response pulses (pair pulses) from the transponder after it has transmitted the interrogation pulses (pair pulses). (See, for example, Japanese Patent No. 2,629,612).

A specific frequency is allocated to each DME ground apparatus. The DME ground apparatus can therefore be identified with the frequency allocated to it.

The DME ground apparatus can respond to the interrogations from a plurality of interrogators (aircrafts). The DME ground apparatus can give about 100 aircrafts distance data. Nonetheless, the ground apparatus neglects weak electric waves coming from far-off aircrafts if about 100 or more aircrafts make an access to it. Thus, the DME ground apparatus would not be over-loaded.

The channels assigned to the interrogators provided in the DME ground apparatuses, respectively, differ by 1 MHz one from another. Therefore, the DME ground apparatus is required absolutely not to malfunction even if it receives signals of adjacent channels. If the DME ground apparatus malfunctions, it will give wrong position data to the aircrafts. Should it happen, safety could not be ensured at all.

In view of this, the DME ground apparatus has, as required by law, the standardized function of not processing any interrogation signal it has received, if the frequency of the signal deviates, by 900 kHz or more, from the frequency of any allocated channel.

Hitherto, the function of not processing any interrogation signal whose frequency deviates, by 900 kHz or more, from the frequency of any allocated channel has been implemented by an analog circuit. The circuit configuration of the DME ground apparatus inevitably has a large scale. Much time must be spent in adjusting the DME ground apparatus.

Some technical publications are available, which disclose the gain control performed on DME ground apparatuses. (See, for example, Japanese Patent No. 2,629,612).

As pointed out above, the channels assigned to the interrogators provided in the DME ground apparatuses, respectively, differ by 1 MHz one from another. Therefore, the DME ground apparatus is required not to malfunction even if it receives signals of adjacent channels, in order to ensure safety.

Hence, the DME ground apparatus has the function of not processing any interrogation signal whose frequency deviates, by 900 kHz or more, from the frequency of any allocated channel.

As described above, the function of not processing any interrogation signal whose frequency deviates, by 900 kHz or more, from the frequency of any allocated channel has hitherto been implemented by an analog circuit. The circuit configuration of the DME ground apparatus is inevitably large, and much time must be spent in adjusting the DME ground apparatus.

Japanese Patent No. 2,629,612 indeed describes the gain control performed in a DME ground apparatus, but is silent about any method or device of not processing any interrogation signal whose frequency deviates from any allocated channel by 900 kHz or more.

BRIEF SUMMARY OF THE INVENTION

It is an object of the present invention to provide a DME ground apparatus that can perform, at low cost, the function of not processing any interrogation signal whose frequency deviates, by 900 kHz or more, from the center frequency of the channel allocated to any interrogator.

In an aspect of the present invention, a DME ground apparatus includes: an aerial unit that receives an interrogation signal from an aircraft; a transponder unit that receives the interrogation signal from the aerial unit, generates a response signal in response to the interrogation signal and transmits the response signal to the aircraft; and a monitor control unit that monitors and controls the transponder unit. The transponder unit calculates a center frequency of the interrogation signal received, and two detected outputs whose frequencies are ±900 kHz deviated with respect to the center frequency, respectively, transmits the response signal when a detected output of the center frequency is larger than the detected outputs, and does not transmit the response signal when the detected output of the center frequency is smaller than the detected outputs.

DETAILED DESCRIPTION OF THE INVENTION

The preferred embodiment of the present invention, or a DME ground apparatus, will be described with reference to the accompanying drawings.

Figure 1:
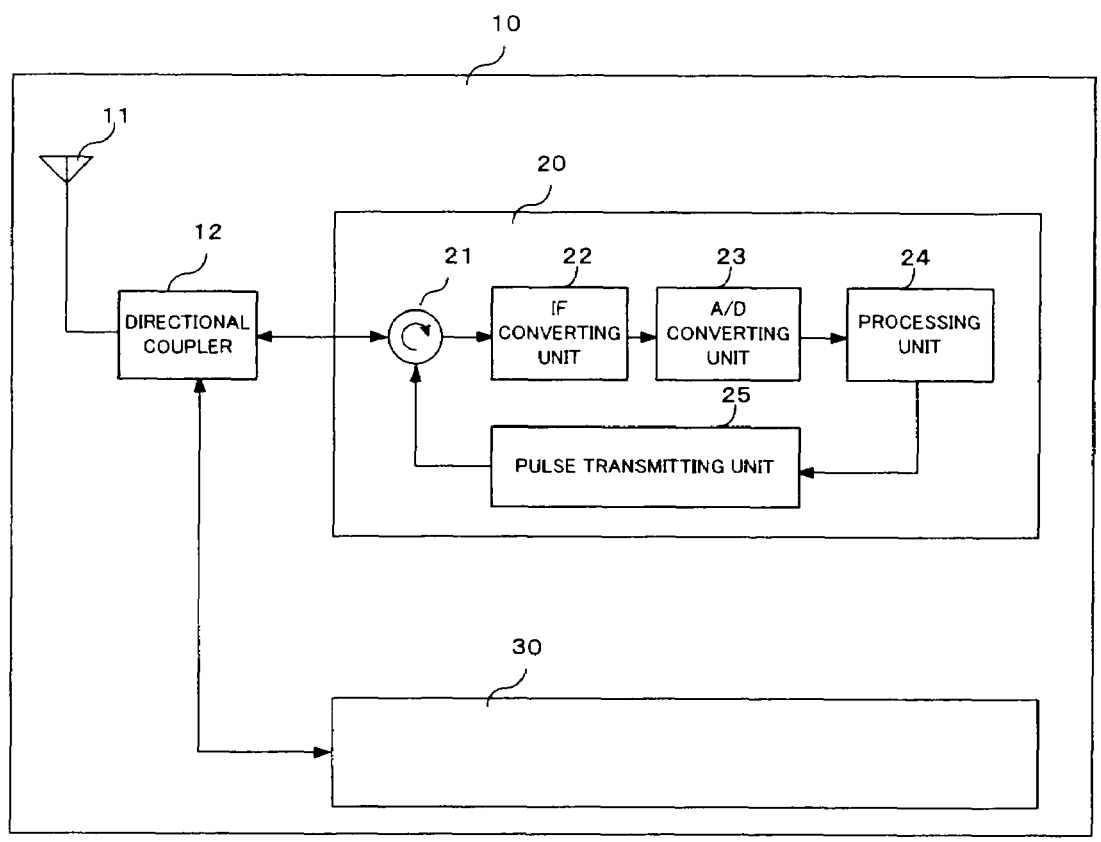
FIG. 1 is a block diagram showing a DME ground apparatus according to an embodiment of the present invention.

FIG. 1 is a block diagram showing a DME ground apparatus according to an embodiment of the present invention. The DME ground apparatus 10 mainly includes an aerial unit (antenna unit) 11, a directional coupler 12, a transponder unit 20, and a monitor control unit 30. The aerial unit 11 receives interrogation signals from aircrafts (not shown) and transmits response signals. The directional coupler 12 is connected to the aerial unit 11. The transponder unit 20 generates response signals in response to the interrogation signals from the aircrafts. The monitor control unit 30 monitors the other components of the DME ground apparatus 10.

The aerial unit 11 is an antenna that catches interrogation pulse signals from the airborne apparatuses mounted in the aircrafts. A specific band is allocated to each DME ground apparatus 10. The DME ground apparatus 10 can therefore receive signals of the various frequencies falling in the specific band.

The directional coupler 12 is of the type generally used. That is, it is a general-purpose device used in the routing of the microwave transmission, to isolate, separate or combine signals.

The transponder unit 20 includes a circulator 21, an IF converting unit 22, an analog-to-digital (A/D) converting unit 23, a processing unit 24, and a pulse transmitting unit 25. The circulator 21 receives signals transmitted from the interrogator (not shown) incorporated in the airborne apparatus mounted in an aircraft, through the aerial unit 11 and directional coupler 12, and isolates, separates or couples the signals it has received. The IF converting unit 22 converts the output of the circulator 21 to a signal of intermediate frequency (IF) band. The A/D converting unit 23 performs A/D conversion on the output of the IF converting unit 22, generating a digital signal. The processing unit 24 performs a prescribed process (later described) on the digital signal generated by the A/D converting unit 23, thereby calculating the detected output, such as the received signal, and determining whether the frequency of the detected output is within a range of plus or minus 900 kHz from the center frequency. The pulse transmitting unit 25 transmits or does not transmit the pulses of a response signal in accordance with the decision made by the processing unit 24.

The IF converting unit 22 is designed to convert a high-frequency signal to an IF (intermediate frequency) signal that can be easily processed (modulated or demodulated). The unit 22 has an ordinary circuit configuration known in the art. Although not shown, the IF converting unit 22 is composed of a high-frequency amplifier circuit, a mixer, a local oscillation circuit, and the like. A signal from the aircraft is input to the transponder unit 20 via the aerial unit 11 and the directional coupler 12. In the transponder unit 20, the signal is input to the IF converting unit 22 via the circulator 21. In the IF converting unit 22, the high-frequency amplifier circuit amplifies the signal received, and the mixer mixes the signal with a local oscillation signal from the local oscillation circuit. The signal is thereby converted in terms of frequency, providing an IF-band signal.

The interrogation signal and the response signal have a pseudo Gaussian waveform so that the frequency band may be effectively used and any signal may not interfere with other signals of similar frequencies. Therefore, the A/D converting unit 23 quantizes the input signal, generating digital pulses by using a prescribed threshold based on the pulse peak of the pseudo Gaussian waveform.

The processing unit 24 is constituted by a digital circuit that calculates a detected output such as a signal received (i.e., a DC voltage that is proportional to the level of the high-frequency signal), thereby to determine whether the frequency of the detected output is within a range of plus or minus 900 kHz from the center frequency. Although not shown, the digital circuit is composed of a numeric controlled oscillator (NCO), a low-pass filter (LPF), an arithmetic and logic unit (ALU), a decision device, and the like.

Figure 2:
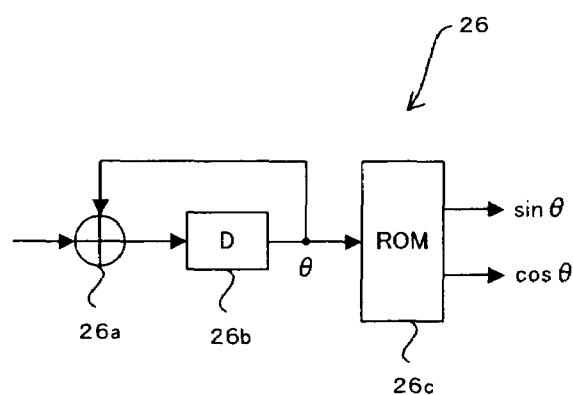
FIG. 2 is a circuit diagram showing an example of NCO used in the DME ground apparatus according to the present invention.

The NCO has a configuration of the type generally known. FIG. 2 shows the circuit configuration of the NCO. As shown in FIG. 2, the NCO 26 includes an adder 26a, a delay circuit (D) 26b, and a ROM 26c. The adder 26a receives an output signal from an adder (not shown). The delay circuit 26b is connected to the adder 26a. The ROM 26c is connected to the delay circuit 26b. The adder 26a and the delay circuit 26b constitute an accumulator. The accumulator converts the frequency of the signal input to the NCO 26 to value θ corresponding to the phase of the signal. The maximum output value of the accumulator corresponds to +π (radian), and the minimum output value thereof corresponds to −π. The ROM 26c outputs sin θ and cos θ that correspond to the output θ of the delay circuit 26b. That is, the ROM 26c generates a sine wave and a cosine wave.

The low-pass filter is typically a finite impulse response (FIR) low-pass filter that removes an unnecessary frequency component.

The pulse transmitting unit 25 imparts a preset system delay-time (e.g., 50 μs) to the signal output from the processing unit 24, in order to transmit a response signal in accordance with the output of the processing unit 24. Then, the unit 25 encodes the signal, thereby generating a response signal. The unit 25 supplies the response signal to the aerial unit 11 via the directional coupler 12. The aerial unit 11 transmits the response signal to the aircraft that has transmitted the interrogation signal.

The response signal (i.e., transmitted pulses including response pulses and random pulses) accords with the following specification. That is, its frequency ranges from 962 MHz to 1,215 MHz, it has Gaussian waveform, it has a peak value of 3 KW or 1.5 KW, and it consists of a pair of pulses having a pulse width of 3.5 μs (spaced apart by, for example, 12 μs). Though the response signal is transmitted randomly, an upper limit of the pulse transmission rate is 2,700 pps.

The monitor control unit 30 receives, via the directional coupler 12, an interrogation pulse signal at a prescribed level, which is similar to the signal from the DME airborne apparatus. Further, the monitor control unit 30 receives, via the directional coupler 12, a response pulse signal that has been output from the pulse transmitting unit 25 by the transponder unit 20. From this response pulse signal, the unit 30 always monitors the operating state of the DME ground apparatus 10. The monitor control unit 30 may have a digital counter, which counts the pulses of the response pulse signal. In this case, the monitor control unit 30 performs a control in accordance with the number of pulses counted.

How the DME ground apparatus 10 so configured as described above operates will be explained.

First, a signal is received at the aerial unit 11 and converted to an IF signal, which is then AD-converted to digital signal. Then, the operation proceeds in two steps (1) and (2). In the step (1), a detected output is obtained in the processing unit 24. In the step (2), it is determined whether the frequency of the detected output is within a range of plus or minus 900 kHz from the center frequency.

Assume that the aerial unit 11 receives an interrogation signal from the interrogator of the airborne apparatus mounted in an aircraft. The interrogation signal is input to the transponder unit 20 via the directional coupler 12. In the transponder unit 20, the interrogation signal is input to the IF converting unit 22 via the circulator 21. The IF converting unit 22 converts the input interrogation signal to a signal of intermediate frequency (IF) band. The interrogation signal thus converted is input to the A/D converting unit 23. The A/D converting unit 23 AD-converts the interrogation signal to a digital interrogation signal. The digital interrogation signal is input to the processing unit 24.

The processing unit 24 performs the step (1), or performing various processes to generate a detected output.

That is, in the processing unit 24, the NCO 26 generates a sine wave and a cosine wave, both pertaining to the frequency of the IF signal or to the difference between the sampling frequency and the frequency of the IF signal. The sine wave and cosine wave are multiplied by the digital interrogation signal input to the processing unit 24 and having an IF band, whereby digital IQ detection is accomplished.

Of "IQ," I stands for in-phase, and "Q stands for quadrature phase.

More precisely, the signal components of sin θ, cos θ output from the NCO 26 are multiplied by the digital interrogation signal output from the A/D converting unit 23, achieving the rotation-symmetry conversion of vector, and converting (demodulating) the IF-band interrogation signal to a signal of base-band.

Next, the low-pass filter removes the unnecessary frequency component from the signal of the base band. Thus, the low-pass filter allows the passage of the base-band signal only.

Next, the square sum of base-band signals that has passed through the low-pass filter is first obtained, and the square root of the square sum is then obtained (thus, accomplishing quadrature synthesis of vector). The square root of the square sum pertains to a difference at I phase and to a difference at Q phase. Hence, the square root of the square sum represents the magnitude of the signal vector that has resulted in such differences. The result of this calculation is an output detected from the input signal. This output is a DC voltage proportional to the level of the high-frequency signal.

Then, the frequencies of the two outputs of the NCO within a range of ±900 kHz from the center frequency (i.e., the frequency of the IF signal, or interrogation signal), respectively, are calculated by the same process sequence as described above. Thus, two detected outputs are obtained.

Subsequently, the step (2) is performed in the processing unit 24. That is, the detected outputs are compared in terms of magnitude, with the three frequencies obtained in the above-mentioned process sequence (i.e., center frequency, two frequencies within a range of ±900 kHz of the IF signal). It is thus determined whether or not the frequencies of the detected outputs are within a range of plus or minus 900 kHz from the center frequency, respectively.

This determination is made by comparing three detected outputs (having three different frequencies, respectively) for one of the following two cases (A) and (B).

(A) If the outputs ±900 kHz deviated from the center frequency, respectively, are smaller than the output of the center frequency, they are determined to be desirable waves. In this case, the DME ground apparatus 10 performs a prescribed process, whereby the pulse transmitting unit 25 transmits a signal to the aircraft.

(B) If the outputs ±900 kHz deviated from the center frequency, respectively, are greater than the output of the center frequency, they are determined to be signals of the adjacent channels. Hence, the DME ground apparatus 10 does not perform the prescribed process at all.

Thus, the function of not processing any interrogation signal whose frequency deviates, by 900 kHz or more, from the center frequency of the channel allocated to any interrogator can be implemented at low cost in the DME ground apparatus.

The present embodiment can provide a DME ground apparatus at low cost, which can detect and identify any signal whose frequency deviates, by 900 kHz or more, from the channel frequency allocated to any interrogator, and which therefore will not malfunction even if it receives interrogation signals of adjacent channels.

It should be noted that the present invention is not limited to the embodiment described above. The components of the embodiment can be modified in various manners in reducing the invention to practice, without departing from the spirit or scope of the invention. Further, the components of the embodiment described above may be combined, if necessary, in appropriate ways, thereby to make different inventions. Still further, some of the components of the embodiment may be omitted. Moreover, the components of possible different embodiments of the invention may be combined in any desired fashion.

What is claimed is:

1. A DME ground apparatus comprising:
   an aerial unit that receives an interrogation signal from an aircraft;
   a transponder unit that receives the interrogation signal from the aerial unit, generates a response signal in response to the interrogation signal and transmits the response signal to the aircraft; and
   a monitor control unit that monitors and controls the transponder unit, wherein the transponder unit includes,
      a circulator that isolates, separates, or couples a received signal,
      an IF converting unit that converts an output of the circulator to an IF-band signal,
      an analog-to-digital converting unit that AD-converts and digitizes the IF-band signal from the IF converting unit,
      a processing unit that calculates, from a digital signal digitized by the analog-to-digital converting unit, three detected outputs including a center frequency of the digital signal and frequencies that are ±900 kHz deviated with respect to the center frequency, and compares and determines the magnitude of the calculated three detected outputs, and
      a pulse transmitting unit that transmits a pulse of a response signal in accordance with a result determined by the processing unit,
   the transponder unit calculates detected outputs of a center frequency of a received interrogation signal, and two frequencies that are ±900 kHz deviated with respect to the center frequency,
   determines, when the detected output of the center frequency is larger than the detected outputs whose frequencies are ±900 kHz deviated with respect to the center frequency, a received signal as a desired signal and transmits a response signal to the aircraft, and
   determines, when the detected output of the center frequency is smaller than the detected outputs whose frequencies are ±900 kHz deviated with respect to the center frequency, a received signal as a signal of an adjacent channel and does not transmit a response signal to the aircraft.

2. The DME ground apparatus according to claim 1, wherein the IF converting unit has a high-frequency amplifier circuit configured to amplify a received signal, a local oscillation circuit configured to generate a local oscillation signal, and a mixer configured to mix the signal with the local oscillation signal to convert the received signal to the IF-band signal.

3. The DME ground apparatus according to claim 1, wherein the analog-to-digital converting unit quantizes an input signal by using a prescribed threshold based on the pulse peak of pseudo Gaussian waveform to wave-shape the input signal and convert the input signal to digital pulses.

4. The DME ground apparatus according to claim 1, wherein the processing unit is constituted by a digital circuit that calculates a detected output such as a received signal, to determine whether a frequency of the detected output is within a range of ±900 kHz with respect to the center frequency.

5. The DME ground apparatus according to claim 4, wherein the digital circuit includes a numeric controlled oscillator configured to generate at least a sine wave and a cosine wave, and a low-pass filter configured to remove an unnecessary frequency component.

6. The DME ground apparatus according to claim 5, wherein the low-pass filter is a finite impulse response (FIR) low-pass filter.

7. The DME ground apparatus according to claim 1, wherein the pulse transmitting unit imparts a preset system delay-time to the signal output from the processing unit, in accordance with the output of the processing unit, then encodes the signal again, and transmits the signal as the response signal to the aircraft that has transmitted the interrogation signal.

* * * * *